(12) United States Patent
Brookhart

(10) Patent No.: US 8,843,831 B2
(45) Date of Patent: Sep. 23, 2014

(54) TECHNIQUES FOR INFORMATION COLLABORATION

(75) Inventor: Christopher J. Brookhart, Lehi, UT (US)

(73) Assignee: Novell, Inc., Provo, UT (US)

( * ) Notice: Subject to any disclaimer, the term of this patent is extended or adjusted under 35 U.S.C. 154(b) by 808 days.

(21) Appl. No.: 12/272,882

(22) Filed: Nov. 18, 2008

(65) Prior Publication Data

US 2010/0125798 A1 May 20, 2010

(51) Int. Cl.
*G06F 3/048* (2013.01)
*G06Q 10/10* (2012.01)
*G06F 17/30* (2006.01)

(52) U.S. Cl.
CPC ............ *G06F 17/3089* (2013.01); *G06Q 10/10* (2013.01)
USPC ......................................................... 715/752

(58) Field of Classification Search
USPC ......................................................... 715/752
See application file for complete search history.

(56) References Cited

U.S. PATENT DOCUMENTS

| | | | |
|---|---|---|---|
| 6,078,948 A | 6/2000 | Podgorny et al. | |
| 6,519,629 B2 * | 2/2003 | Harvey et al. | 709/204 |
| 6,571,234 B1 * | 5/2003 | Knight et al. | 1/1 |
| 6,681,247 B1 * | 1/2004 | Payton | 709/217 |
| 7,031,969 B2 | 4/2006 | Lawrence et al. | |
| 7,188,141 B2 | 3/2007 | Novaes | |
| 7,379,945 B1 | 5/2008 | Hirsch et al. | |
| 7,899,829 B1 * | 3/2011 | Malla | 707/741 |
| 2002/0165856 A1 | 11/2002 | Gilfillan et al. | |
| 2003/0005053 A1 * | 1/2003 | Novaes | |
| 2005/0182645 A1 * | 8/2005 | Ehlis et al. | 705/1 |
| 2005/0198116 A1 * | 9/2005 | Appleman et al. | 709/203 |
| 2005/0234891 A1 * | 10/2005 | Walther et al. | 707/3 |
| 2006/0036603 A1 | 2/2006 | Laney | |
| 2006/0173824 A1 * | 8/2006 | Bensky et al. | 707/3 |
| 2006/0248584 A1 * | 11/2006 | Kelly et al. | 726/18 |
| 2007/0214097 A1 * | 9/2007 | Parsons et al. | 706/12 |
| 2007/0220016 A1 | 9/2007 | Estrada et al. | |
| 2007/0256033 A1 * | 11/2007 | Hiler | 715/860 |
| 2008/0147810 A1 * | 6/2008 | Kumar et al. | 709/206 |
| 2008/0215616 A1 | 9/2008 | Hirsch et al. | |
| 2009/0030923 A1 * | 1/2009 | Chalmers et al. | 707/101 |
| 2009/0077062 A1 * | 3/2009 | Spivack et al. | 707/5 |
| 2009/0132516 A1 * | 5/2009 | Patel et al. | 707/5 |
| 2009/0292526 A1 * | 11/2009 | Harari et al. | 704/9 |
| 2011/0022602 A1 * | 1/2011 | Luo et al. | 707/748 |

OTHER PUBLICATIONS

"Ancestry Press", http://ancestrypress.ancestry.com/Default.aspx, The Generations Network, Inc., (2008).

(Continued)

*Primary Examiner* — William Bashore
*Assistant Examiner* — Hien Duong
(74) *Attorney, Agent, or Firm* — Schwegaman, Lundberg & Woessner, P.A.

(57) ABSTRACT

Techniques for information collaboration are presented. Information topics are defined by users within a virtual community. Comments, links to other topics, search terms used in connection with the information topic, and bookmarks are recorded in connection with each of the information topics. Security access is custom designated for: the information topic as a whole, the comments, the links, the search terms, and/or the bookmarks. The security access defines whether other second users of the virtual community are to be given access to each of the information topics and/or to each comment, link, search term and/or bookmark associated with each of those information topics.

14 Claims, 3 Drawing Sheets

(56) References Cited

OTHER PUBLICATIONS

"Cisco Targets $34B Market with New Collaboration Portfolio", http://www.sda-asia.com/sda/news/psecom,id,20381,srn,4,nodeid,4,_language,Singapore.html, SDA Asia Magazine, (Sep. 30, 2008).

"IBM Brings Collaboration and Search Together to Enhance Enterprise Information Access", http://www-03.ibm.com/press/us/en/pressrelease/21822.wss, IBM Press Release, (Jun. 29, 2007).

"MyGenealogy.com", http://www.genealogy.com/cgi-bin/my_main.cgi, The Generations Network, (Copyright 1996-2007).

Levitt, Mark, "Competitive Analysis: Worldwide Integrated Collaborative Environments 2006: Vendor Shares: New Opportunities are Shaking the ICE", ftp://ftp.software.ibm.com/software/lotus/pub/lotusweb/product/domino/WW_ICE_2006_vendor_shares_by_IDC.pdf, (2007), 10 pgs.

* cited by examiner

US 8,843,831 B2

TECHNIQUES FOR INFORMATION COLLABORATION

BACKGROUND

Increasingly individuals are organizing for a variety of reasons via virtual communities over the World-Wide Web (WWW) and Internet. People with similar interests join together to discuss work, personal hobbies, personal relationships, finances, current events, political issues, etc.

Typically, these virtual communities are limited to actions taken by a particular user. That is, a particular user of the virtual community has to affirmatively traverse links of the virtual community and has to organize information in manners familiar to the user. Generally, information is pulled from the virtual community by the users, rather than pushed from the virtual community to the users.

SUMMARY

In various embodiments, techniques for information collaboration are provided. More specifically, and in an embodiment, a method is provided for information collaboration. An information topic is established within a website of a virtual community. The information topic and the website are assigned to a first user within the virtual community. Next, comments, links to other topics within the virtual community, search terms used in connection with the information topic, and bookmarks are assigned and recorded in connection with the information topic. Also, a security access level is designated for one or more of: the information topic as a whole, the comments, the links, the search terms, and the bookmarks. The security access level defines whether other second users of the virtual community are to be given access to: the information topic as a whole, the comments, the links, the search terms, and/or the bookmarks.

DETAILED DESCRIPTION

A "resource" includes a user, content, a processing device, a node, a service, an application, a system, a directory, a data store, groups of users, a World-Wide Web (WWW) page, a component of a WWW page (such as a bookmark), or various combinations of these things, etc. The term "service" and "application" may be used interchangeably herein and refer to a type of software resource that includes instructions, which when executed by a machine (computer or processor-enabled device) performs operations that change the state of the machine and that may produce output.

Various embodiments of this invention can be implemented in whole or in part within existing network architectures, security systems, WWW portals, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
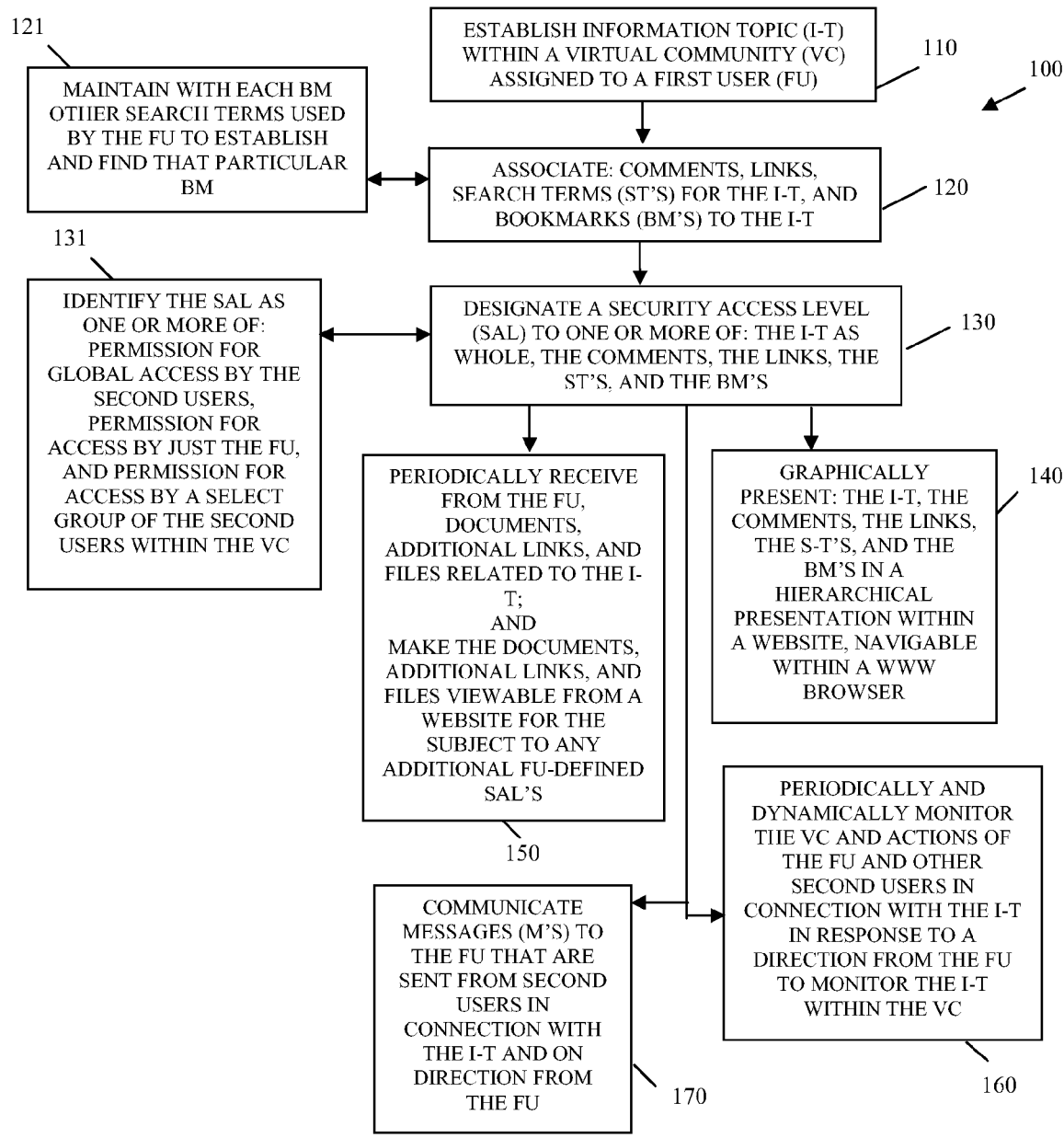
FIG. 1 is a diagram of a method for information collaboration, according to an example embodiment.

FIG. 1 is a diagram of a method 100 for information collaboration, according to an example embodiment. The method 100 (hereinafter "information manager") is implemented as instructions within a machine-accessible and computer-readable storage medium. The instructions when executed by a machine (computer or processor-enabled device) perform the processing depicted in FIG. 1. The information manager is also operational over and processes within a network. The network may be wired, wireless, or a combination of wired and wireless. In an embodiment, the network is the Internet.

At 110, the information manager establishes an information topic within a website of a virtual community. The information topic and the website are assigned to a first user within the virtual community. In other words, an authenticated or registered first user of a virtual community logs into his/her account that includes one or more web pages (website) hosted by a provider of the virtual community. Once logged into the first user account, the first user accesses interface screens to create an information topic. The information topic can be associated with anything that the first user desires to have a discussion on and/or conduct research on. This can include current events, education, sports, science, religion, business, politics, personal affairs, etc.

At 120, the information manager associates a variety of comments, links, search terms, and bookmarks with the information topic as metadata that is accessible from the website. So, in addition to having links that are on a website associated with the information topic, an evaluation of the web browser for the user can yield specific bookmarks that the user has associated with the information topic. The information manager detects or is specifically directed by the user to associate user-defined bookmarks from the user's browser with the information topic.

According to an embodiment, at 121, the information manager maintains each bookmark with search terms, which were used by the first user to establish and find that particular bookmark. Thus, when the first user conducts searches within the virtual community, the search terms are trapped and should the user bookmark a piece of information these search terms are associated with and linked to the bookmark.

For example, suppose that a user logs into a virtual community that processes the information manager. Once there, the user creates an information topic or topic node. The information topic is depicted or hosted on its own website or page within the virtual community. When the user enters this page, a variety of actions can be taken by the first user, which the information manager detects and tracks. For example, the user may visit other websites, which the user initially locates via a search tool bar integrated into the web page of the first user's information topic. The actual search terms used for the search are noted and tracked by the information manager and then associated with the subsequent pages that the user visits. The user can also bookmark sites found in response to the search terms; these search terms, which were used to find a bookmarked site, are also recorded and noted and linked as metadata with the corresponding bookmarked site.

So, while the user interacts and builds on content associated with an information topic, the information manager actively makes useful metadata associations, such as bookmarked sites, search terms that were used to find bookmarked sites, and the like. The information manager can also passively make these associations, such as when the user affirmatively instructs the information manager to associate specific search terms with bookmarked sites or instructs the information manager to note specific bookmarks, etc.

Also, the comments may be viewed as feedback, musings, or thoughts on the information topic posited by the first user or perhaps other second users of the virtual community; the other second users have access to the information topic and are permitted to leave the comments (in accordance with security—discussed below).

The links can be Uniform Resource Locator (URL) embedded links to information, which is automatically designated as being related to the information topic (discussed below in greater detail) or manually designated as being related to the information topic (by the user or other users of the virtual community). So, the links can be automatically mined and pushed to the user's information topic or can be manually pulled and supplied by the user or other users of the virtual community.

At 130, the information manager designates a security access level for the information topic as a whole and/or for the comments, for the links, for the search terms, and/or for the bookmarks. The security access level defines whether other second users of the virtual community are to be given access to the information topic as a whole (coarse grain level of security) or are to be given access to the comments, links, search terms, and/or bookmarks (fine-grain level of security).

The creating user (first user) of the information topic custom defines security based on identities, roles, and/or group associations that are assigned to the second users of the virtual community. Security can be granted for viewing, editing, deleting, and/or creating sub information topics, etc. The level of detail for security can also be controlled by the first user. So, some users may be able to see some comments posted about the information topic whereas other users may not be able to see the same comments or may not be able to see comments at all. As another example, some portions of the information topic may be viewable by one group of virtual community users and yet not viewable by another group of virtual community users. Security is custom defined by the creating or owning user (referred to herein as the "first user").

According to an embodiment, at 140, the information manager graphically presents the information topic, the related comments, the related links, the search terms, and the bookmarks in a hierarchical presentation to the first user within a website (set of web pages), which was designated by the first user for the information topic when the information topic was initially created.

Thus, within an assigned virtual community user space (website or hosted web pages) for a particular user (first user), the particular user creates information topics for research, comment, debate, presentation for others in the virtual community or perhaps just for the consumption of the creating user. Any searches that the user conducts in connection with a particular information topic along with the search terms used and bookmarks retained are also maintained. This is organized in a hierarchical presentation from one or more pages on the website and presented to the user (or other uses if permitted based on the security access levels). Conceptually, this may be viewed as a form of a mind map for the information topic.

The actual hierarchical presentation can be dynamically generated and customized on demand. In other words, different levels of detail for the hierarchy of information can be presented to the user and generated (rendered for viewing) when requested by the user.

In addition, at 150, the information manager periodically receives from the first user a variety of content that is to be associated with the information topic, such as by way of example only, documents, additional links, files, images, video, audio clips, graphics, automated programs or applications, and the like. This additional content is also integrated with and viewable from the website and is also subject to any first user-defined security access level restrictions. Essentially, the user can fully enrich the information topic over time to include a variety of content that is integrated into the information topic via the website.

In still another case, at 160, the information manager periodically and dynamically monitors the entire virtual community for actions of the first user and other second users of the virtual community that are made in connection with the information topic. This is an automated mining or enrichment feature that the creating first user can activate via a profile setting or policy setting. So, any similar sets of search terms, bookmarks, or links that the information manager detects as being used in the virtual community can be flagged as activities that are related to the information topic and assuming new information flows from these actions, the information manager can present that new information to the first user for potential integration into the information topic.

In yet another enhancement, at 170, the information manager communicates messages to the first user that are sent from second users and made in connection with the information topic. This is also done at the direction of the first user. So, the first user (creator or owner of the information topic being enriched) can identify those second users that are permitted to send messages to the first user related to the information topic. The information manager filters out and prevents any messages that are not authorized from ever reaching the first user. In some cases reports about undelivered messages can be periodically sent to the first user.

Thus, the first user can control who sends information or messages about the information topic to the first user. Additionally, the first user can control all aspects of how the information topic evolves and is enriched on the website within the virtual community. So, the first user controls what information is integrated into the information topic; controls who sees what content about the information topic; controls how users interact and modify the content; controls whether content is automatically monitored and mined from the virtual community to enrich the information topic; etc.

Figure 2:
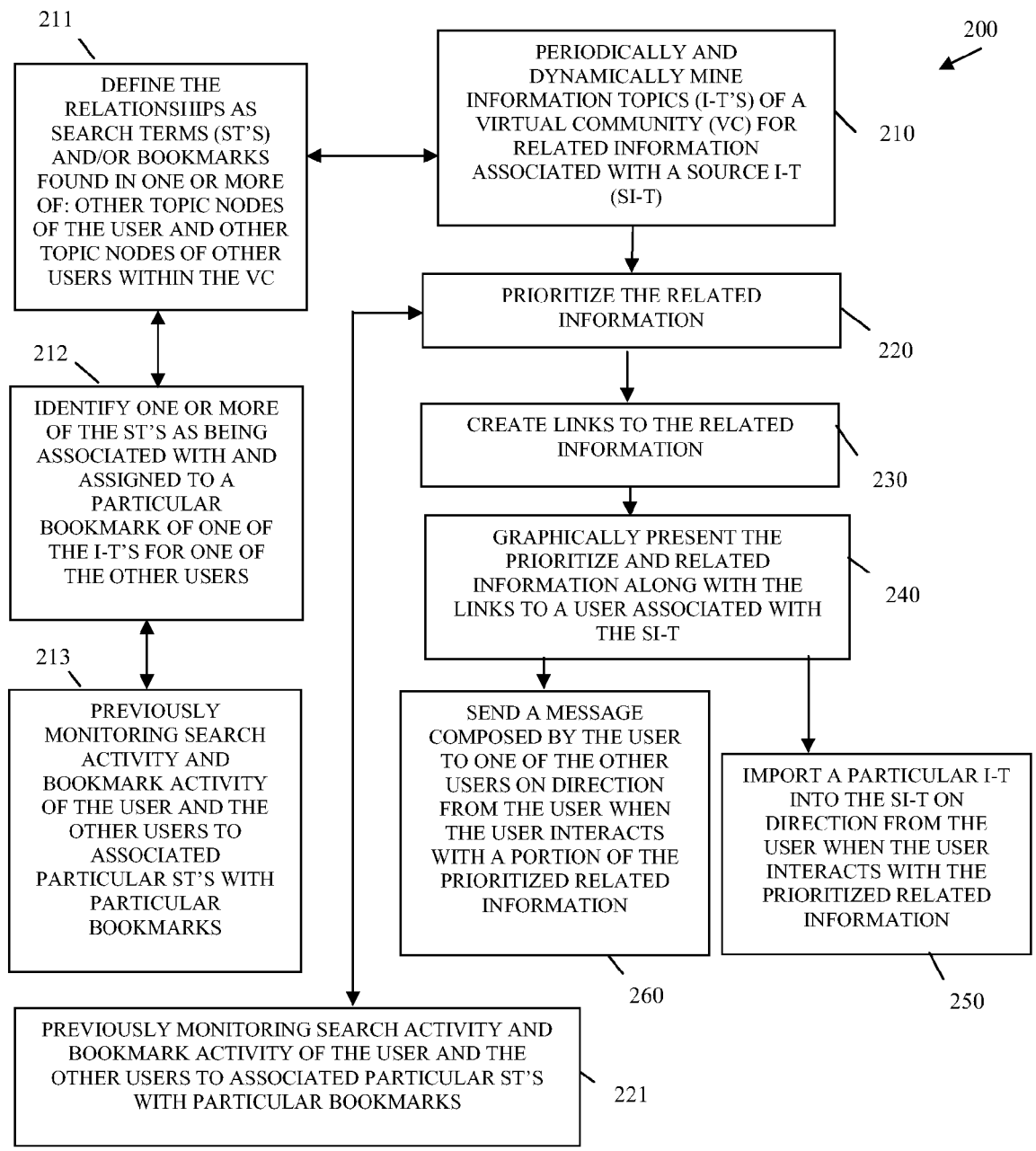
FIG. 2 is a diagram another method for information collaboration, according to an example embodiment.

FIG. 2 is a diagram another method 200 for information collaboration, according to an example embodiment. The method 200 (hereinafter "collaboration enrichment service") is implemented as instructions in a machine-accessible and readable medium. The instructions when executed by a machine perform the processing depicted in FIG. 2. The collaboration enrichment service is also operational over and processes within a network. The network may be wired, wireless, or a combination of wired and wireless. In an embodiment, the network is the Internet and is accessible by users via a WWW browser.

The method 100 was primarily focused on presenting a technique for initially establishing a user-defined and user-controlled information topic within a virtual community; the collaboration enrichment service of the method 200 is primarily focused on automated mechanisms for enriching and presenting a user-defined information topic within the virtual community.

At 210, the collaboration enrichment service periodically and dynamically mines information topics of a virtual community for relationships to related information associated with a source information topic.

What is determined to be a "relationship" and "related" can be resolved in a variety of manners.

For example, at 211, the collaboration enrichment service can define relationships as search terms and/or bookmarks that are found while mining the virtual community in one or more of the following: other topic or information nodes of the user and other topic or information nodes of other users of the virtual community. So, if a user creates a first information topic (may also be referred to herein as "topic node" or "information node") then any searches conducted and bookmarks retained by that user in connection with that topic node can be used to determine what is related to the original information node. Similarly, other (non owning) second users of the virtual community may engage in searches and retain bookmarks that match to search terms and bookmarks used in the original information node. These searches used and bookmarks retained may be associated with entirely different information or topic nodes. The matching search terms and bookmarks can be used to establish a relationship between different topic nodes (information topics) of the virtual community.

It is noted that in some cases, a user may make a manual association between two different information topics of the virtual community. This manual association can be communicated via interface options to the collaboration enrichment service and used to associate and enrich content for both of the information topics. Enrichment can be done in a one-way fashion, such as from information topic #1 to information topic #2, but not vice versa from information topic #2 to information topic #1. Alternatively, as mentioned above the enrichment can be reciprocal between the two information topics.

Continuing with the embodiment at 211 and at 212, the collaboration enrichment service identifies one or more of the search terms as being associated with and assigned to a particular bookmark of one of the information topics for one of the other second users of the virtual community. In other words, a relationship can be established between different information topics by recognizing that a particular second user has the same or similar search terms for a piece of his/her bookmarked content in a particular information topic that a first owning user has for a different piece of bookmarked content for the information topic that is being enriched.

Still continuing with the embodiment at 212 and at 213, the collaboration enrichment service may have previously monitored search activity and bookmark activity of the user for purposes of associating and making the connection between particular search terms and particular bookmarks. Essentially, an integrated search bar monitors what searching a user does and what actions a user takes (activated links, retained, bookmarks, ignored, etc.) based on the search terms used in those searches. This can be a custom search tool or can be one that is publicly available over the Internet. The collaboration enrichment service does not have to be integrated with the search tool, it just needs to detect when it is being used to monitor the search terms used and actions subsequently taken within a WWW browser.

At 220, the collaboration enrichment service prioritizes the related information that was mined from the virtual community. Here, weights can be used to determine what mined information is likely to be more relevant than other mined information. Something a user flags as being related is weighted more heavily than something the user never flagged and something that may have just one matching search term for one bookmarked piece of content. Prioritization algorithms can be custom defined and modified over time to enhance the relevancy computations.

According to an embodiment, at 221, the collaboration enrichment service previously monitored search activity and bookmark activity of the user and the other uses to associate particular search terms with particular bookmarks. That is, the collaboration enrichment service learns how to prioritize by analyzing search and bookmark activity and actions taken by users to rate or adopt content associated with those searches and bookmarks.

At 230, the collaboration enrichment service creates links to the related information that is mined from the virtual community and that is prioritized.

At 240, the collaboration enrichment service graphically presents the prioritized and related information with the links to a user who is associated with the source information topic.

According to an embodiment, at 250, the collaboration enrichment service imports a particular information topic into the source information topic on direction received from the user. This is done when the user is presented with the prioritized and related information and selects an option to have the collaboration enrichment service import the information topic into the source information topic.

In another case, at 260, the collaboration enrichment service sends a message composed by the user to one of the other uses on direction from the user, when the user interacts with a portion of the prioritized and related information.

So, the collaboration enrichment service, without user intervention, searches for relationships among a user's own information topics, identifies related shared information topics created by other users within the virtual community (assuming the user has access to these other users' topics); and gathers related information from non-related information topics within the virtual community (again assuming the user has access to these other non-related information topics). The collaboration enrichment service then creates links to all this information, prioritizes it and organizes it. Next, the collaboration enrichment service presents the information graphically to the user of the original information topic that is being enriched. The user can then adopt selective information to enrich the user's information topic.

The information can also include usefulness/credibility ranking that identifies the frequency with which a particular piece of information has been adopted and incorporated by other users into information topics. So, the users and the information can include its own metadata managed within the virtual community that includes metrics or reputation ratings, which can be used to assist the user in deciding whether to adopt information into the user's information topic.

Figure 3:
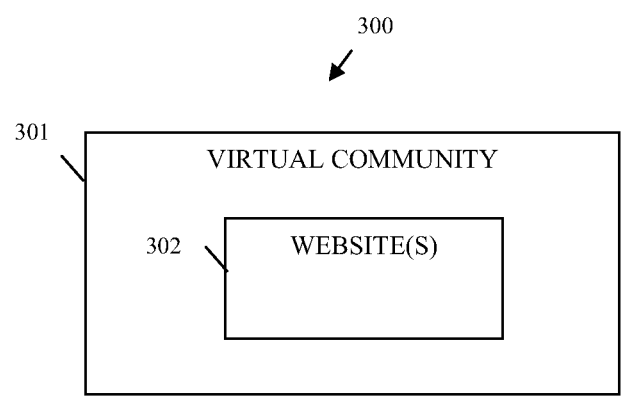
FIG. 3 is a diagram of an information collaboration system, according to an example embodiment.

FIG. 3 is a diagram of an information collaboration system 300, according to an example embodiment. The information collaboration system 300 is implemented as instructions (within a machine-accessible and computer-readable storage medium) that when executed by a machine (computer or processor-enabled device) perform, among other things, the processing discussed above with respect to the methods 100 and 200 of the FIGS. 1 and 2, respectively. Moreover, the information collaboration system 300 is operational over a network, and the network may be wired, wireless, or a combination of wired and wireless.

The information collaboration system 300 includes a virtual community 301 and a website 302. Each of these components of the information collaboration system 300 and their interactions with one another will now be discussed in detail.

The virtual community 301 is implemented in a machine-accessible and computer readable storage medium and processes on one or more machines (computer or processor-enabled devices). Example enhanced features of the virtual community 301 are presented in detail above with the descriptions of the methods 100 and 200 of the FIGS. 1 and 2, respectively.

The website 302 is implemented in a machine-accessible and computer-readable storage medium and processes on one or more machines (computer or processor-enabled devices).

The website 302 includes a plurality of information topics defined by and managed by a first user of the virtual community 301. The first user is an owner, administrator, and/or creator of the information topics. Each information topic has: a title; comments; search terms used in connected with searches, which are related to that information topic; bookmarks related to that information topic; and links to other data, which is related to the information topic and which the first user has adopted.

The first user also defines access rights to each information topic and each component of information housed within a particular information topic.

The virtual community 301 includes the information topics of the first user and a variety of other information topics defined and managed by other second users of the virtual community 301. The first user and the second users collaborate with one another within the virtual community 301 in relation to the information topics. Each second user has his/her own website 302, which includes a plurality of WWW pages defining each of the other additional information topics. Collaboration activity is circumscribed by the access rights defined by the first user and by other access rights defined by each of the other second users for the other information topics.

In an embodiment, the website 302 and the other websites 302 are WWW pages accessible via WWW browsers over the Internet to the first user and the second users once the first and second users authenticate for access to the virtual community 301.

In a particular arrangement, each information topic is organized within a particular WWW page to which it relates in a hierarchical presentation that is navigable via the WWW browser.

The users (first and second users) can designate whether specific information topics are to be proactively and dynamically monitored within the virtual community 302. Examples of this type of processing were discussed above with reference to the method 200 of the FIG. 2.

According to an embodiment, the access rights and the other access rights permit a private access designation. The private access designation permits just or only an owner to view and access a particular information topic. Another access rights designation permits global access to the first and the second users to a particular information topic. In still another case, a shared access rights designation permits a selective number or grouping of users within the virtual community 302 to view and access a particular information topic. It is noted, that these designations can occur at a finer-grain level for just components or pieces of information within a particular information topic.

Figure 4:
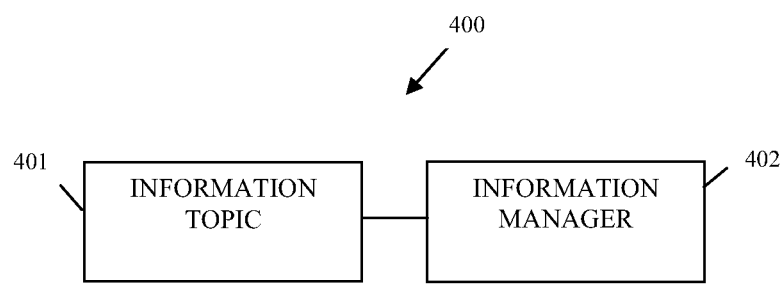
FIG. 4 is a diagram of another information collaboration system, according to an example embodiment.

FIG. 4 is a diagram of another information collaboration system 400, according to an example embodiment. The information collaboration system 400 is implemented as instructions on or within a machine-accessible and computer-readable storage medium. The instructions when executed by one or more machines (computer(s) or processor-enabled device(s)) perform processing depicted with respect to the methods 100 and 200 of the FIGS. 1-2, respectively. The information collaboration system 400 is also operational over a network and the network may be wired, wireless, or a combination of wired and wireless.

The information collaboration system 400 presents another perspective and in some cases enhanced perspective of the information collaboration system 300 discussed above with reference to the system 300 of the FIG. 3.

The information collaboration system 400 includes an information topic interface 401 and an information manager 402. Each of these and their interactions with one another will now be discussed in detail.

The information topic interface 401 is implemented in a machine-accessible and computer-readable storage medium and is to process on a machine (computer or processor-enabled device) of the network. Some aspects of the information topic interface 401 were presented above with reference to the method 100 of the FIG. 1.

The information topic interface 401 interacts with users of a virtual community to define information topics, which are defined by the users. The users also assign security rights to their information topics or to portions of their information topics, which restrict access.

According to an embodiment, at least one information topic includes a bookmark to a link within the virtual community and the bookmark also includes search terms used by a particular user to find and locate that bookmark. In a particular situation, the information topic interface 401 includes an integrated search bar that a particular user accesses for processing a search with the search terms. This permits the information manager 402 (discussed below) to assign and associate the search terms with the bookmark.

The information manager 402 is implemented in a machine-accessible and computer-readable storage medium and instructions that process on one or more machines (computer(s) or processor-enabled device(s)) on the network. Example processing associated with the information manager 402 was presented in detail above with reference to the methods 100 and 200 of the FIGS. 1 and 2, respectively, and with respect to the system 300 of the FIG. 3.

The information manager 402 mines the information topics to establish relationships and create related information topics on behalf of the users, subject to the security rights associated with each information topic or each component piece of content included within each information topic.

Next, the information manager 402 prioritizes, organizes, and presents the related information to the users via the information topic interface 401 for actions by the user. Actions can include ranking the related information as being highly related or unrelated along a predefined scale, such as 0-10 (with 10 being highly related and 0 being totally unrelated). Another action can be to adopt or import the related information into a particular user's information topic. Still another action can permit one user to send messages to another user within the virtual community in response to the related information or information topic (again subject to permissions granted by the users that are to receive the messages). The actions are accessible via the information topic interface 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for information collaboration, comprising:
    establishing an information topic within a website of a virtual community, the information topic and website established by and assigned to a first user within the virtual community;
    associating with the information topic: comments, links to other topics within the virtual community, search terms used in connection with the information topic, and bookmarks, recorded in connection with the information topic, and evaluating a web browser of the first user to yield the bookmarks, the bookmarks assigned to the information topic by the first user, the search terms noted and tracked when used to retrieve the information topic and the search terms are recorded with or assigned to the bookmarks, and the comments represent feedback or thoughts on the information topic posted by the first user or other second users of the virtual community, some comments restricted based on security enforcement, wherein the first user can see particular comments of some of the second users but the first user is unable to see other comments of other second users based on the security enforcement;
    designating, by direction of the first user, a security access level to one or more of: the information topic as a whole, the comments, the links, the search terms, and the bookmarks, wherein the security access level defines whether the other second users of the virtual community are to be given access to: the information topic as a whole, the comments, the links, the search terms, and the bookmarks; and
    controlling by the first user all aspects of how the source information topic evolves and is enriched by the other second users within the virtual community.

2. The method of claim 1 further comprising, graphically presenting the information topic, the comments, the links, the search terms, and the bookmarks in a hierarchical presentation within the website, wherein the hierarchical presentation is navigable within a World-Wide Web (WWW) browser.

3. The method of claim 1 further comprising:
    periodically receiving, from the first user, documents related to the information topic, additional links related to the information topic and files related to the information topic; and
    making the documents, additional links, and files viewable from the website in connection with the information topic to the first user and the other second users subject to any additional first user defined security access levels.

4. The method of claim 1 further comprising, periodically and dynamically monitoring the virtual community and actions of the first user and the other second users in connection with the information topic in response to a direction from the first user to monitor the information topic within the virtual community.

5. The method of claim 1 further comprising, communicating messages to the first user that are sent from the second users in connection with the information topic in response to a direction from the first user that messages are permissible to the first user in connection with the information topic.

6. The method of claim 1, wherein associating further includes maintaining with each bookmark search terms used by the first user to establish that particular bookmark.

7. The method of claim 1, wherein designating further includes identifying the security access level as one or more of the following: permission for global access by the other second users of the virtual community, permission for access by just the first user, and permission for access by a select grouping of the other second users of the virtual community.

8. A machine-implemented method for managing information collaboration, comprising:
    periodically and dynamically mining information topics of a first user and other users within a virtual community for relationships to related information associated with a source information topic of the first user;
    prioritizing the related information by using weights assigned to the related information and weighting first user assigned flags more heavily than pieces of related information not flagged by the first user and other related information having just one matching search term for one bookmarked piece of content, the search terms captured when searches are conducted on the information topics, the weights assigned via a customized prioritization algorithm that is modified over time to enhance relevancy computations, and the related information including a credibility ranking that identifies the frequency with which a particular piece of information has been adopted and incorporated by other users into information topics, the credibility ranking managed by the virtual community and the related information including reputation ratings for the other users of the virtual community assisting the first user in deciding whether to adopt selective information to enrich the source topic;
    creating links to the related information; and
    graphically presenting the prioritized and related information along with the links to the first user associated with the source information topic.

9. The method of claim 8, wherein periodically and dynamically mining further includes defining the relationships as specific search terms and bookmarks used in connection with the source information topic of the first user that are found in one or more of the following: other topic nodes of the first user and other topic nodes of the other users of the virtual community.

10. The method of claim 9, wherein periodically and dynamically mining further includes identifying one or more of the specific search terms as being associated with and assigned to a particular bookmark of one of the information topics for one of the other users.

11. The method of claim 10, wherein identifying further includes previously monitoring search activity and bookmark activity of the first user and the other users to associate particular search terms with particular bookmarks.

12. The method of claim 8, wherein prioritizing further includes establishing a usefulness or credibility for portions of the related information by identifying how frequently a particular one of the information topics was adopted by the first user and the other users of the virtual community and using the usefulness and credibility when prioritizing the related information.

13. The method of claim 8 further comprising, importing a particular one of the information topics into the source information topic upon direction of the first user when the first user interacts with the prioritized related information and the links.

14. The method of claim 8 further comprising, sending a message composed by the first user to one of the other users upon the direction of the user when the first user interacts with a portion of the prioritized related information and the links that is owned by that other user.

\* \* \* \* \*